US008910121B2

(12) United States Patent  (10) Patent No.: US 8,910,121 B2
Cantarelli et al.  (45) Date of Patent: Dec. 9, 2014

(54) METHOD AND DEVICE FOR PROGRAMMING AN INDUSTRIAL CONTROLLER

(75) Inventors: Matteo Cantarelli, Cork (IE); Matthias Reusch, Hohenstein (DE); Herbert Walter, Schlierbach (DE); Florian Stanko, Sersheim (DE); Timo Nawratil, Stuttgart (DE)

(73) Assignee: Pilz GmbH & Co. KG, Ostfildern (DE)

( * ) Notice: Subject to any disclaimer, the term of this patent is extended or adjusted under 35 U.S.C. 154(b) by 991 days.

(21) Appl. No.: 12/761,954

(22) Filed: Apr. 16, 2010

(65) Prior Publication Data

US 2010/0268358 A1  Oct. 21, 2010

(30) Foreign Application Priority Data

Apr. 20, 2009 (EP) ..................... 09158215

(51) Int. Cl.
 G06F 9/44 (2006.01)
 G06F 11/32 (2006.01)
 G05B 19/05 (2006.01)
(52) U.S. Cl.
 CPC ..................... *G05B 19/05* (2013.01)
 USPC ............. 717/125; 717/127; 714/46; 700/108
(58) Field of Classification Search
 None
 See application file for complete search history.

(56) References Cited

U.S. PATENT DOCUMENTS 5,291,587 A * 3/1994 Kodosky et al. ................ 703/2
6,880,106 B2   4/2005 Donhauser et al.
6,961,924 B2 * 11/2005 Bates et al. .................... 717/125
7,383,539 B2 *  6/2008 Bates et al. .................... 717/129
7,669,186 B2 *  2/2010 Nolan et al. ................... 717/124

(Continued)

FOREIGN PATENT DOCUMENTS

CN     101529351 A    9/2009
DE  10 2004 062 852 A1  7/2006

(Continued)

OTHER PUBLICATIONS

Magnenat, S., et al., "Scripting the Swarm: Event-Based Control of Microcontroller-Based Robots," SIMPAR 2008 Workshop Proceedings [online], 2008 [retrieved May 28, 2013], Retrieved from Internet: <http://lasa.epfl.ch/publications/uploadedFiles/aseba-epuck-camera-ready.pdf>, pp. 1-14.*

(Continued)

*Primary Examiner* — Don Wong
*Assistant Examiner* — Todd Aguilera
(74) *Attorney, Agent, or Firm* — Harness, Dickey & Pierce, P.L.C.

(57) ABSTRACT

An installation comprises at least one sensor for providing sensor data representing a real system state of the installation and at least one actuator for acting on the real system state. A controller for controlling the installation comprises a data memory for storing the sensor data and a program memory for storing a machine code program. A programming tool for programming the controller includes a program editor, a debugging tool and a compiler. A machine code program is executed on the controller while the debugging tool is activated, and the debugging tool determines a reverse relationship between the machine code running on the controller and at least one high level control instruction shown in the program editor, thereby linking at least one high level control instruction to a real system state during the execution of the machine code program.

13 Claims, 5 Drawing Sheets

(56) References Cited

U.S. PATENT DOCUMENTS

| | | | |
|---|---|---|---|
| 7,721,196 B2* | 5/2010 | Tilford et al. | 715/236 |
| 7,945,900 B2* | 5/2011 | Hsieh et al. | 717/129 |
| 8,429,613 B2* | 4/2013 | Rosen | 717/124 |
| 8,434,062 B2* | 4/2013 | Gawor et al. | 717/113 |
| 2001/0052088 A1 | 12/2001 | Donhauser et al. | |
| 2002/0054098 A1 | 5/2002 | Schmitt et al. | |
| 2003/0018957 A1* | 1/2003 | Bates et al. | 717/129 |
| 2005/0066314 A1* | 3/2005 | Bates et al. | 717/129 |
| 2007/0113218 A1* | 5/2007 | Nolan et al. | 717/124 |
| 2008/0016388 A1 | 1/2008 | Opaterny | |
| 2008/0127065 A1 | 5/2008 | Bryant et al. | |
| 2008/0134146 A1 | 6/2008 | Horn et al. | |

FOREIGN PATENT DOCUMENTS

| | | |
|---|---|---|
| EP | 0 990 964 A1 | 4/2000 |
| EP | 1 184 758 A2 | 3/2002 |
| EP | 1 184 759 A2 | 3/2002 |
| EP | 1 119 801 B1 | 5/2003 |
| EP | 1 870 787 A1 | 12/2007 |
| JP | 61-122751 | 6/1986 |
| JP | 3-110601 | 5/1991 |
| JP | 5-66934 | 3/1993 |
| JP | 2005-115969 | 4/2005 |

OTHER PUBLICATIONS

Koskimies, K., et al., "Scene: Using Scenario Diagrams and Active Text for Illustrating Object-Oriented Programs," Proceedings of the 18th Int'l Conf. on Software Engineering [online], 1996 [retrieved Aug. 20, 2014], Retrieved From Internet: <URL: http://ieeexplore.ieee.org/xpls/abs_all.jsp?arnumber=493431>, pp. 366-375.*
EN ISO 13849-1; Safety of machinery—Safety-related parts of control systems—Part 1: General principles for design; 2006; 97 pages.
IEC 61131-1; Programmable controllers—Part 1: General information; May 2003; 24 pages.
DIN EN 954-1; Safety-related parts of control systems; 1997; 34 pages.
IEC 61508-2; Functional safety of electrical/electronic/programmable electronic safety-related systems; May 2000; 152 pages.
Search Report from the Patent Office of the People's Republic of China for Appl'n No. 201010167320.8, dated Sep. 10, 2013; 3 pp.

* cited by examiner

```
IF (STATE=1) THEN
    IF (ARM_AT_LEFT=TRUE AND ARM_AT_TOP=TRUE) THEN
        IF (START_PRESSED=TRUE) THEN
            MOVE_DOWN:=TRUE;
            NEXT_STATE:=1;
        END_IF;
    END_IF;
ELSIF (STATE=2) THEN
    IF (ARM_AT_LEFT=TRUE AND ARM_AT_BOTTOM=TRUE) THEN
        CLOSE_GRIP:=TRUE;
        MOVE_DOWN:=FALSE;
        NEXT_STATE:=3;
    END_IF;
ELSIF (STATE=3) THEN
    IF (ARM_AT_LEFT=TRUE AND ARM_AT_TOP=TRUE AND GRIPPER_CLOSED=TRUE) THEN
        MOVE_RIGHT:=TRUE;
        NEXT_STATE:=4;
    END_IF;
ELSIF (STATE=4) THEN
    IF (ARM_AT_RIGHT=TRUE AND ARM_AT_TOP=TRUE AND GRIPPER_CLOSED=TRUE) THEN
        MOVE_DOWN:=TRUE;
        NEXT_STATE:=5;
    END_IF;
ELSIF (STATE=5) THEN
    IF (ARM_AT_RIGHT=TRUE AND ARM_AT_BOTTOM=TRUE AND GRIPPER_CLOSED=TRUE) THEN
        CLOSE_GRIP:=FALSE;
        MOVE_DOWN:=FALSE;
        NEXT_STATE:=6;
    END_IF;
ELSIF (STATE=6) THEN
    IF (ARM_AT_RIGHT=TRUE AND ARM_AT_TOP=TRUE) THEN
        MOVE_RIGHT:=FALSE;
        NEXT_STATE:=0;
    END_IF;
END_IF;
```

Fig.3

METHOD AND DEVICE FOR PROGRAMMING AN INDUSTRIAL CONTROLLER

CROSS-REFERENCES TO RELATED APPLICATIONS

This application claims priority from European patent application EP 09 158 215.5 filed on Apr. 20, 2009 with the European Patent Office.

BACKGROUND OF THE INVENTION

The present invention relates to a method and a device of programming an industrial controller for controlling an automated installation, and more particularly to a method and a device using a debugging tool to facilitate analysis of the resulting controller program.

In the world today, many technical processes run automated or at least partially automated. Examples can be found at industrial manufacturing sites and production plants, but also in daily life situations at the luggage claim of airports, ski lifts in skiing resorts, roller coasters at entertainment parks etc. Machines and other components of such an installation are operated by industrial controllers which receive and process sensor data from sensors in the installation and which produce control signals for driving actuators in the installation. For example, the operational position of a robot arm may be automatically controlled as a function of sensor data representing an instantaneous position of the robot arm and as a function of a desired trajectory of the robot arm defined by a control program. The control signals generated by the controller energize an electrical drive which moves the robot arm in the desired direction. The control operations for controlling the robot arm may be very complex. Nevertheless, it is desired to have a high flexibility in the control process. Therefore, it is typical to use programmable controllers, i.e. controllers where the control logic is determined by a software which is typically called the application program.

There are a number of special purpose programming languages that are typically used for programming industrial controllers. In particular, international standard IEC 61131 defines several programming languages. These programming languages are high level programming languages in terms of the present invention, because they do not result in a machine code program which is executable on a specific controller. Rather, a program written in a-the high level programming languages has to be translated into a lower level machine code program in order to be executable on a specific controller. The translation process may comprise several stages including intermediate level program code. For sake of simplicity, the term "compiler" is used here for any kind of suitable translator including line-by-line translators (interpreters) and other kinds of translators. Likewise, the term "machine code program" is used here for any lower level program code which is the result of a translation process and which may be run on a controller or an equivalent machine that is capable of providing true sensor data from a controlled process or installation.

Use of a high level programming language greatly facilitates the process of programming an industrial controller, because the high level programming language provides a plurality of high level control instructions which allow a programmer to focus on the control problem and the control logic rather than the practical implementation on a specific hardware of a controller. Accordingly, high level programming languages are widely used.

Nevertheless, control programs for modern highly automated control applications can be very complex, and it is often difficult to identify programming errors. Therefore, it is common to use debugging tools. A debugging tool or debugger is a special computer program that is used in the process of finding programming errors in other programs, such as the application program. Typically, a debugging tool allows the application program, which is to be debugged, to run in a step-by-step mode (single-step) and/or with what is called breakpoints. A breakpoint is a special stop command not used in the normal course of the application program, which stop command allows the application program under examination to stop and pause at the breakpoint so that the programmer has sufficient time to check the status achieved by the application program at said breakpoint.

EP 1 184 758 A2 discloses an approach for debugging an application program for an industrial controller, wherein a single-step mode and/or a breakpoint mode can be used not only at the level of the machine code, but also at the level of the high level programming language, and in particular on a flow chart level. Accordingly, programming errors can be searched for at different levels, which allegedly facilitates error detection.

DE 10 2004 062 852 A1 discloses an industrial controller having an integrated debugging function. The integrated debugger allows to run the application program step-by-step and/or using breakpoints, as described above. However, there may be situations where a controlled process may not be interrupted in order to avoid, for instance, uncontrolled machine movements. Therefore, DE 10 2004 062 852 A1 proposes breakpoints which can be selectively activated or deactivated.

DE 10 2004 062 852 A1 thus addresses a fundamental problem which is specific for debugging application programs for industrial controllers in contrast to debugging computer programs for desktop applications, for instance, namely limitations resulting from the inability to stop a controlled installation at any instance of time. It is not uncommon that a complex control program for an industrial controller can only be debugged in a simulation run, i.e. without actually moving or otherwise controlling the installation.

Moreover, it can still be a very time consuming and grueling process to debug a complex control program for an industrial controller using existing debugging tools.

SUMMARY OF THE INVENTION

In view of this background, it is an object of the present invention to provide a method and a device for programming an industrial controller including an enhanced debugging feature for a time-efficient debugging of complex application programs.

According to one aspect of the invention, there is provided a method of programming an industrial controller for controlling an automated installation, the installation comprising at least one sensor for providing sensor data representing a real system state of the installation and at least one actuator for acting on the real system state, and the controller comprising a data memory for storing the sensor data and a program memory for storing a machine code program, the method comprising the steps of providing a programming tool having a program editor, a debugging tool and a compiler, creating a high level control program by means of the program editor, the high level control program comprising a plurality of high level control instructions, compiling the high level control program by means of the compiler in order to create a machine code program comprising machine code instructions for repeatedly reading the sensor data into the data memory and for processing the sensor data, loading the machine code program into the program memory, and activating the debugging tool for debugging the high level control program, wherein the high level control instructions are shown in the program editor, wherein the machine code program is executed on the controller while the debugging tool is activated, wherein the debugging tool reads the sensor data from the data memory, and wherein the debugging tool assigns the sensor data from the data memory to the at least one high level control instruction, thereby linking the at least one high level control instruction to a real system state during the execution of the machine code program.

According to another aspect, there is provided a computer program product comprising a storage medium and comprising program code stored on the storage medium, wherein the program code is configured to carry out a method of programming an industrial controller for controlling an automated installation when the program code is executed on a computer acting as a programming tool for programming the industrial controller, the installation comprising at least one sensor for providing sensor data representing a real system state of the installation and at least one actuator for acting on the real system state, and the controller comprising a data memory for storing the sensor data and a program memory for storing a machine code program, the method comprising the steps of providing a programming tool having a program editor, a debugging tool and a compiler, creating a high level control program by means of the program editor, the high level control program comprising a plurality of high level control instructions, compiling the high level control program by means of the compiler in order to create a machine code program comprising machine code instructions for repeatedly reading the sensor data into the data memory and for processing the sensor data, loading the machine code program into the program memory, and activating the debugging tool for debugging the high level control program, wherein the high level control instructions are shown in the program editor, wherein the machine code program is executed on the controller while the debugging tool is activated, wherein the debugging tool reads the sensor data from the data memory, and wherein the debugging tool assigns the sensor data from the data memory to the at least one high level control instruction, thereby linking the at least one high level control instruction to a real system state during the execution of the machine code program.

There is also provided a programming device for programming an industrial controller of an automated installation, the installation comprising at least one sensor for providing sensor data representing a real system state of the installation and at least one actuator for acting on the real system state, and the controller comprising a data, memory for storing the sensor data and a program memory for storing a machine code program, the programming device comprising a program editor for creating a high level control program, the high level control program comprising a plurality of high level control instructions, a compiler for compiling the high level control program in order to create a machine code program comprising machine code instructions for repeatedly reading and processing the sensor data, an interface for loading the machine code program into the program memory of the controller, and a debugging tool for debugging the high level control program, wherein the high level control instructions are shown in the program editor, wherein the debugging tool is configured to start execution of the machine code program on the controller, wherein the debugging tool is configured to read the sensor data from the data memory, and wherein the debugging tool is further configured to assign the sensor data from the data memory to the at least one high level control instruction, thereby linking the at least one high level control instruction to a real system state during the execution of the machine code program.

The debugging tool of the new method and device do not rely on the use of breakpoints and/or a step-by-step mode, although these conventional debugging functions might also be used, where appropriate. A core aspect, however, is to establish a real reverse relationship between the machine code running actually on the controller and at least one and preferably several high level control instructions shown in the program editor. Establishing this kind of reverse relationship comprises to identify which group of machine code instructions executed on the controller corresponds to a particular high level control instruction so that the at least one high level control instruction shown in the program editor can be linked to a real system state during the execution of the machine code program. Determining the reverse relationship may involve, to some extent, a step of decompiling the machine code program in order to retranslate the machine code instructions into the at least one high level control instruction. However, there might be implementations which do not require a step of decompiling. For example, the basis for the reverse relationship might already be laid in the compilation process by integrating appropriate references into the machine code.

Establishing the reverse relationship allows to link the high level control instruction and a specific system state of the controlled installation, which specific system state is the result of the control operations initiated by said high level control instructions. In other words, the new debugging tool correlates the at least one high level control instruction and its effect on the real system state of the controlled installation. The new debugging tool establishes the new reverse relationship automatically and, preferably, for any high level control instruction of the application program.

Another aspect of the new debugging tool is the assignment of real sensor data read from the data memory of the controller to the at least one high level control instruction identified as a result of the reverse relationship. Both aspects together provide the link between the real system state at a specific instance of time during the control process and the high level control instruction responsible for this specific system state.

It will be appreciated that the new debugging tool facilitates an efficient debugging process, because the programmer can easily check the real effect of a particular high level control instruction on the controlled installation. Establishing the new link between the real system state and a particular high level control instruction reveals the cause in the cause-and-effect chain between the high level control program and the controlled installation. The more complex the application program is, the more facilitates the new debugging tool the debugging process. Accordingly, the above object is completely achieved.

In a preferred refinement of the invention, the debugging tool repeatedly reads the sensor data from the data memory, while the machine code program is executed on the controller.

According to this refinement, the debugging tool provides up to date sensor data not only for a specific instance of time, but for longer periods of time during the execution of the control program. Long-term variations in the behavior of the controlled installation can easier be considered in the debugging process.

According to another preferred refinement, the machine code program is executed on the controller in real time.

According to this refinement, the machine code program is executed neither with breakpoints nor with a specific step-bystep mode. Rather, the machine code program is executed substantially in the same way as it is executed in the true control process. Executing the machine code program under real life conditions provides a realistic picture of the control process and therefore still further enhances the debugging process. This is particularly true for application programs and control operations that have to deal with natural forces such as gravity, because those forces cannot be stopped or slowed down.

In another refinement, a history of sensor data read from the data memory is assigned to the at least one high level control instruction. As an alternative or in addition, the debugging tool reads the sensor data from the data memory and assigns it to the at least one high level control instruction as a function of a predefined trigger condition.

Both refinements may facilitate the user analysis of the collected sensor data in the case that the sensor data changes very rapidly while the machine code program is executed on the controller and/or in a program loop that is being examined. A history of sensor data might be any form of a data collection which shows the current and former (historical) values of the sensor data in the course of time. A predefined trigger condition is any condition that can be defined by a user or automatically in order to identify a certain instance of time for reading the desired sensor data. Thus, the predefined condition provides a trigger signal for reading the sensor data which is assigned to the at least one high level control instruction.

In another refinement, however, it might be advantageous to execute the machine code program on the controller in a step-by-step fashion.

This refinement is advantageous if a big amount of sensor data has to be monitored and considered in the debugging process, such as in very complex controlled scenarios. Making use of a step-by-step execution of the control program, if possible in a real life scenario, facilitates the programmer's view to all the relevant sensor data.

In another refinement, the high level control program comprises a plurality of high level control instructions in a sequential order which corresponds to a temporal sequence during the execution of the machine code program, with the debugging tool assigning the sensor data from the data memory to the at least one high level control instruction in accordance with the temporal sequence.

According to this refinement, one and the same high level program variable shown in the program editor may have different values at substantially one and the same time (or at least in the same operating cycle) depending on the position within the high level control program where the high level program variable is used. For example, a Boolean variable may have the value "true" after the at least one high level control instruction has been executed, but the same Boolean variable may have the value "false" prior to the execution of said high level control instruction. The present refinement reflects such a change in the value of a high level program variable as a result of the temporal sequence in the execution of the machine code program. This refinement still further facilitates an efficient debugging of a complex high level control program by exploiting real sensor data in accordance with the temporal sequence or the timing behavior of the machine code program on the controller. In other words, this refinement is advantageous, because it takes into account the timing behavior of the controlled installation in the debugging process.

According to yet another refinement, a limited number of high level control instructions are selected from the plurality of high level control instructions, and the debugging tool determines the reverse relationship between the machine code running on the controller and the high level control instructions for the limited number only.

In this refinement, only a limited number of high level control instructions are available for the new debugging process. The limitation might seem disadvantageous at first glance, but it has turned out that the debugging tool can be operated more efficient, because less processing time is required for establishing the reverse relationship. In other words, the debugging process is concentrated on a limited number of high level control instructions which are of particular interest, and the reverse relationship is determined for those selected control instructions only. The reverse relationship can be established much faster for the limited number of control instructions.

In another refinement, the at least one high level control instruction comprises a high level program variable, with the debugging tool assigning the sensor data from the data memory to the high level program variable.

This refinement provides a very simple and straight forward assignment of real sensor data to the at least one high level control instruction. Accordingly, this refinement allows a rather easy implementation of the new debugging tool. In another refinement, however, the debugging tool may assign the sensor data from the data memory to a complex control instruction including both program commands and program variables. This latter refinement increases the flexibility and the performance of the new debugging tool.

According to yet another refinement, the at least one high level control instruction corresponds to a plurality of sensor data from the data memory, wherein the debugging tool determines a complex data variable from the plurality of sensor data, the complex data variable representing a higher level system state of the installation, and wherein the debugging tool assigns the complex data variable to the high level control instruction.

This refinement provides a very flexible, high performance approach for an efficient debugging process. Combining a plurality of different sensor data into a complex data variable and assigning said complex data variable to the high level control instruction allows to focus on the general system behavior in the debugging process instead of monitoring a plurality of sensor data in detail. For example, the complex data variable may represent the position of a robot arm (top or bottom, left or right), wherein a qualitative or generalized consideration may correspond to a plurality of sensor data coming from a plurality of different position encoders at several axes of the robot. Using the complex data variable in the debugging process allows to monitor the general position of the robot arm, which is much easier and more efficient than monitoring the plurality of different sensor data, provided that the general position of the robot is of major concern in the debugging process.

According to another refinement, the debugging tool displays the sensor data, and in particular the complex data variable, in the program editor at a position close to the high level program instruction.

This refinement allows a very convenient and efficient debugging process, because the programmer can see both the high level control instructions and the effect of the respective instructions on the real installation at the same time, i.e. with one view. The real sensor data is mirrored into the high level program code, which makes it very easy to identify programming errors.

According to another refinement, the debugging tool comprises a database comprising a plurality of graphical symbols each illustrating one from a plurality of predefined system states of the installation, with the debugging tool displaying one (or more) from the plurality of graphical symbols at the position close to the high level program instruction as a function of the assigned sensor data.

This refinement is particularly advantageous, if complex data variables are used in order to mirror high level system states into the program code. For example, a graphical symbol of the robot showing the robot arm at the top or the bottom may be used in order to symbolize a corresponding system state of the robot arm. This refinement, however, might also be used for less complex sensor data, such as an on/off switch which can be represented by one bit only. This refinement provides a very convenient, easy to use interface for the programmer, because the real system states represented by the real sensor data are mirrored into the high level program code in a very intuitive manner. Debugging of a control program for controlling an automated installation is greatly facilitated.

BRIEF DESCRIPTION OF THE DRAWINGS

It goes without saying that the features explained above and those yet to be explained below can be used not only in their respective combinations, but also in other combinations or on their own without departing from the scope of the present invention. Further features and details of embodiments of the invention are explained below with respect to the drawings, in which:

FIG. 3 shows a program editor including high level control instructions in accordance with the method and the device of FIG. 2.

DESCRIPTION OF PREFERRED EMBODIMENTS

Figure 1:
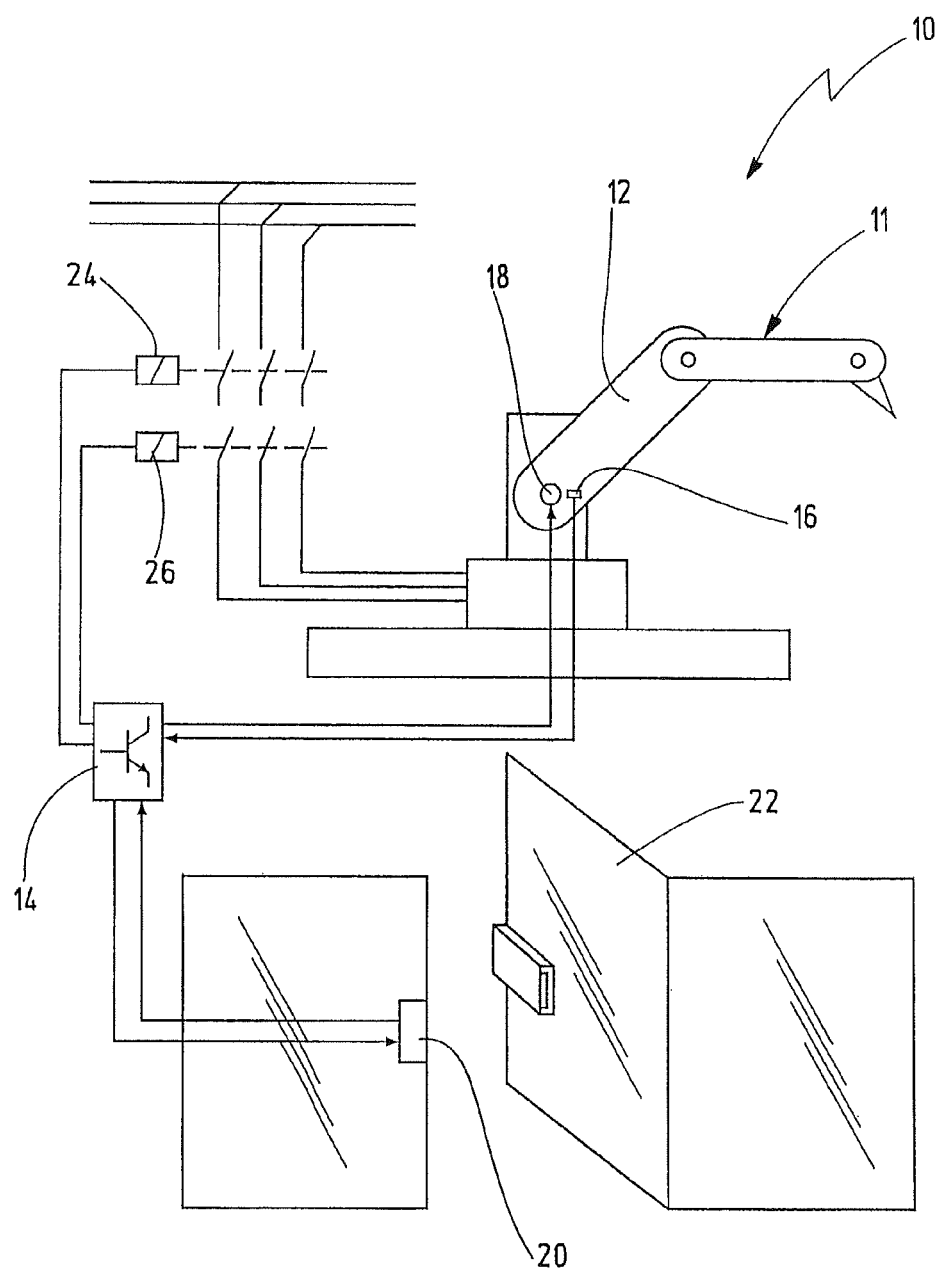
FIG. 1 shows an embodiment of an automated installation including a programmable controller in accordance with the present invention.

FIG. 1 shows a simplified illustration of an installation 10 which is controlled and programmed in accordance with a preferred embodiment of the present invention. By way of example, the installation 10 comprises a robot 11 having a movable robot arm 12. The movements of robot arm 12 are controlled by a programmable controller 14. Controller 14 receives signals from sensors which are configured to measure or detect physical quantities representing a real system state such as, for example, a position or a speed of the robot arm 12 at a defined instance of time. The sensor signals are transmitted to the controller 14 so that the controller 14 receives sensor data representing the respective real system state measured or detected by the sensor. By way of example, a sensor 16 is shown in FIG. 1 in proximity to a rotary drive 18. Sensor 16 is configured to detect an instantaneous movement position of drive 18. Drive 18 is configured to move the robot arm 12 in response to control signals from controller 14. Controller 14 controls drive 18 as a function of control instructions programmed in accordance with the present invention and as a function of the sensor data received from sensor 16. It goes without saying that installation 10 might comprise a plurality of sensors and actuators of various kinds.

In the present embodiment, controller 14 also receives a signal from a guard door switch 20 which is configured to monitor a closed position of a guard door 22. Guard door switch 20 is a typical example of a safety-related sensor used in modern automated installations in order to avoid hazardous situations. Other safety-related sensors might comprise emergency-off pushbuttons, light grids or failsafe camera systems, such as the Assignee's SafetyEYE® camera system. In accordance with preferred embodiments of the invention, controller 14 is configured to process safety related sensor data and non-safety-related (standard) sensor data in order to control robot 11 as a function of both types of information.

In the present embodiment, controller 14 not only controls drive 18, but also contactors 24, 26 which are configured to interrupt the power supply to robot 11 in order to provide a safe stop in response to the sensor data from safety-related sensors, such as a guard door switch 20, if required. It will be appreciated, however, that the present invention can also be used for programmable controllers which do not process safety-related sensor data.

Figure 2:
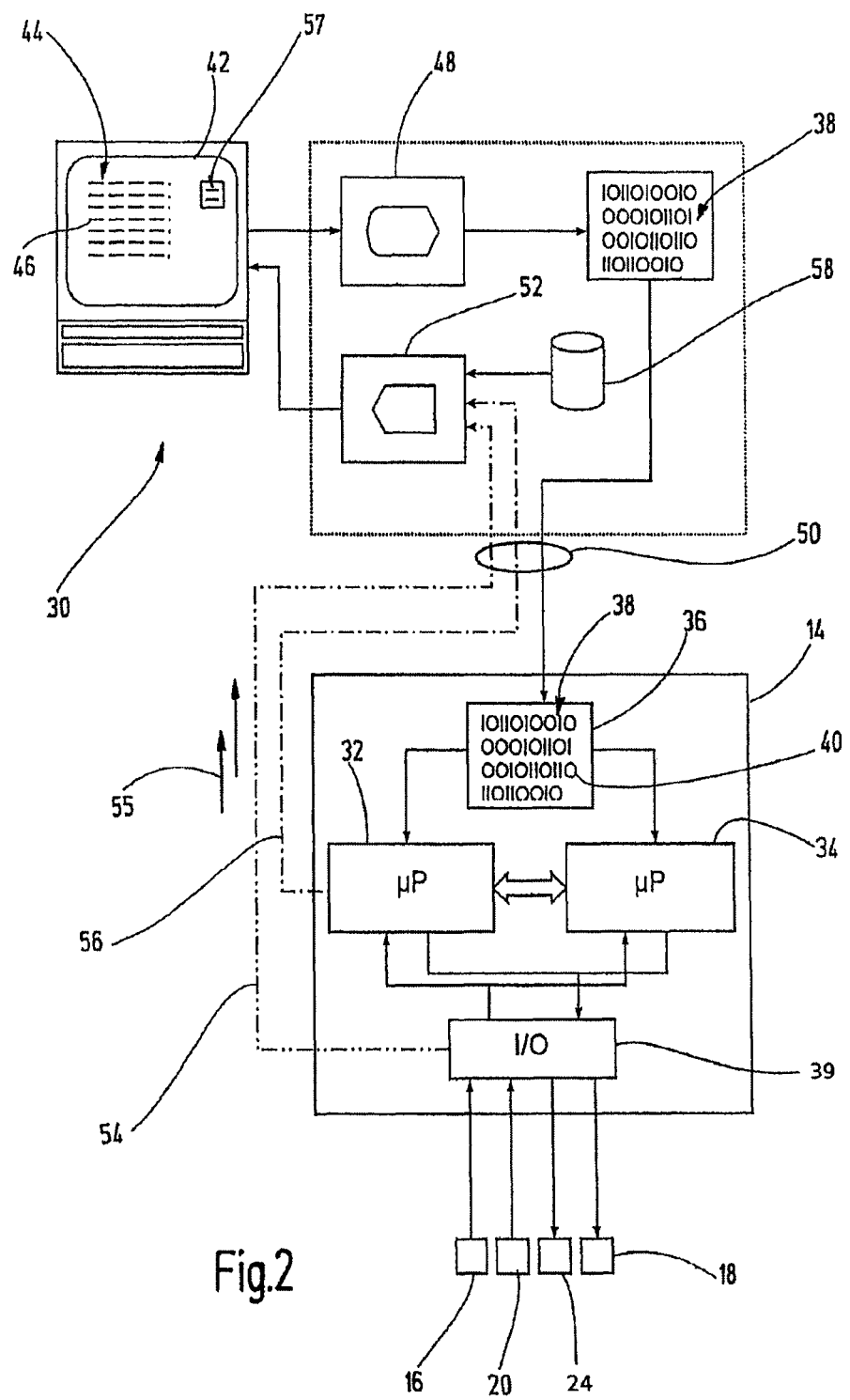
FIG. 2 shows an embodiment of the new method and the new device in a simplified illustration.

FIG. 2 shows a preferred embodiment of a programming tool 30 for programming controller 14. Programmable controller 14 is also shown with the further details.

As can be seen from FIG. 2, controller 14 comprises two redundant microprocessors 32, 34 here. Microprocessors 32, 34 are configured to process control instructions and sensor data with a two-channel redundancy. The two microprocessors compare their respective processing results and monitor each other in order to provide a failsafety required for safety-related control operations. It goes without saying that controller 14 might have a three-channel redundancy and/or other kinds of built-in test functions in order to qualify as a controller for controlling safety-related control operations in accordance with categories 3 or 4 of European standard EN 954-1 or similar requirements in accordance with international standards ISO 13849-1 or IEC 61508. As already indicated above, however, the new method and device might also be used for programming controllers which do not qualify as safety controllers, although the latter is preferred since the new method and device are especially well-suited for debugging safety-related control programs.

Controller 14 comprises a program memory 36 for receiving a machine code program 38 which comprises a plurality of machine code instructions 40. It is contemplated that program memory 36 might comprise several redundant program memories for storing several redundant machine code programs, one for each redundant microprocessor 32, 34. For sake of simplicity, however, only one program memory 36 is shown here, which provides the machine code programs for both microprocessors 32, 34.

Controller 14 also comprises an I/O data memory 39 for storing sensor data and for storing actuator data. The sensor data is received from sensors 16, 20 and is processed by redundant microprocessors 32, 34 in accordance with the machine code instructions stored in program memory 36. As a result of the data processing, actuator data is generated and transmitted to the remote actuators 18, 24, 26 in order to drive actuators 18, 24, 26 appropriately. It will be appreciated that the sensor data stored in I/O data memory 39 might also comprise preprocessed sensor data, such as a 1-bit data resulting from a preprocessed 2-bit redundant sensor.

Programming tool 30 comprises a program editor 42, which is preferably implemented on a general purpose personal computer (PC). Program editor 42 allows to write and edit a high level control program 44 including a plurality of high level control instructions 46. In accordance with preferred embodiments, program editor 42 allows programming in one or more high level programming languages defined in international standard IEC 61131.

Programming tool 30 also comprises a compiler 48 for compiling the high level control program 44 in order to create the machine code program 38. Machine code program 38 is then transferred into program memory 36 via an interface 50, which could be any suitable interface allowing data transfer between PC-based programming tool 30 and controller 14.

As will be appreciated by those skilled in the art, compiler 48 and interface 50 may comprise hardware components and/or software components of the PC which also provides the program editor 42.

The programming tool 30 further comprises a debugging tool 52, which is also implemented as a software and/or hardware component on the PC in preferred embodiments. The debugging tool 52 is configured to read sensor data representing real system states of the installation from I/O data memory 39 via a communication link 54. In some embodiments, debugging tool 52 is capable of reading the sensor data again and again within defined time frames, so that a history of sensor data is actually read, as indicated at reference numeral 55.

Debugging tool 52 is also configured to identify which machine code instructions 40 are currently executed on microprocessor 32 via a communication link 56. In one embodiment, the machine code executed on microprocessors 32 and/or 34 might be configured to write an identifier identifying the currently executed machine code instructions into I/O data memory 39 and/or into a separate memory (not shown here), so that the current machine code instructions can easily be identified by the debugging tool on the basis of the identifier read via link 56.

It is contemplated that debugging tool 52 might be configured to provide a field 57 for defining a trigger condition, which triggers the reading process across links 54 and/or 56. Field 57 can advantageously be used by a programmer in order to define a trigger condition, such as "If robot arm 12 left=true, then read sensor data from memory 39" for example.

Debugging tool 52 interconnects the sensor data from I/O data memory 39 to the high level control instructions 46 shown in the program editor 42 in a manner which is explained in detail further below. Debugging tool 52 is therefore configured to determine a reverse relationship between the machine code currently running on microprocessor 32 and the high level control instructions shown in the program editor 42 at the same time. In preferred embodiments, debugging tool 52 is connected to a database 58 comprising a plurality of graphical symbols, with each graphical symbol illustrating one from a plurality of predefined system states of robot 11. For example, database 58 may comprise graphical symbols showing robot 11 with robot arm 12 in different positions (top, bottom, left, right etc.) Debugging tool 52 may be configured to select one from the plurality of graphical symbols as a function of the real sensor data received via communication link 54 in order to symbolically mirror a current system state of robot 11 into the high level control program 44, as is shown in FIGS. 3 to 5 by way of example.

FIG. 3 shows program editor 42 including a plurality of high level control instructions 46. The plurality of high level control instructions 46 forms a high level control program, which is written in a textual language in the present embodiment. It is also contemplated, however, to use a graphical programming language such as what is known Function Block Diagram defined in international standard IEC 61131.

FIG. 3 shows program editor 42 without debugging tool 52 being activated, i.e. without the new debugging function.

Figure 4:
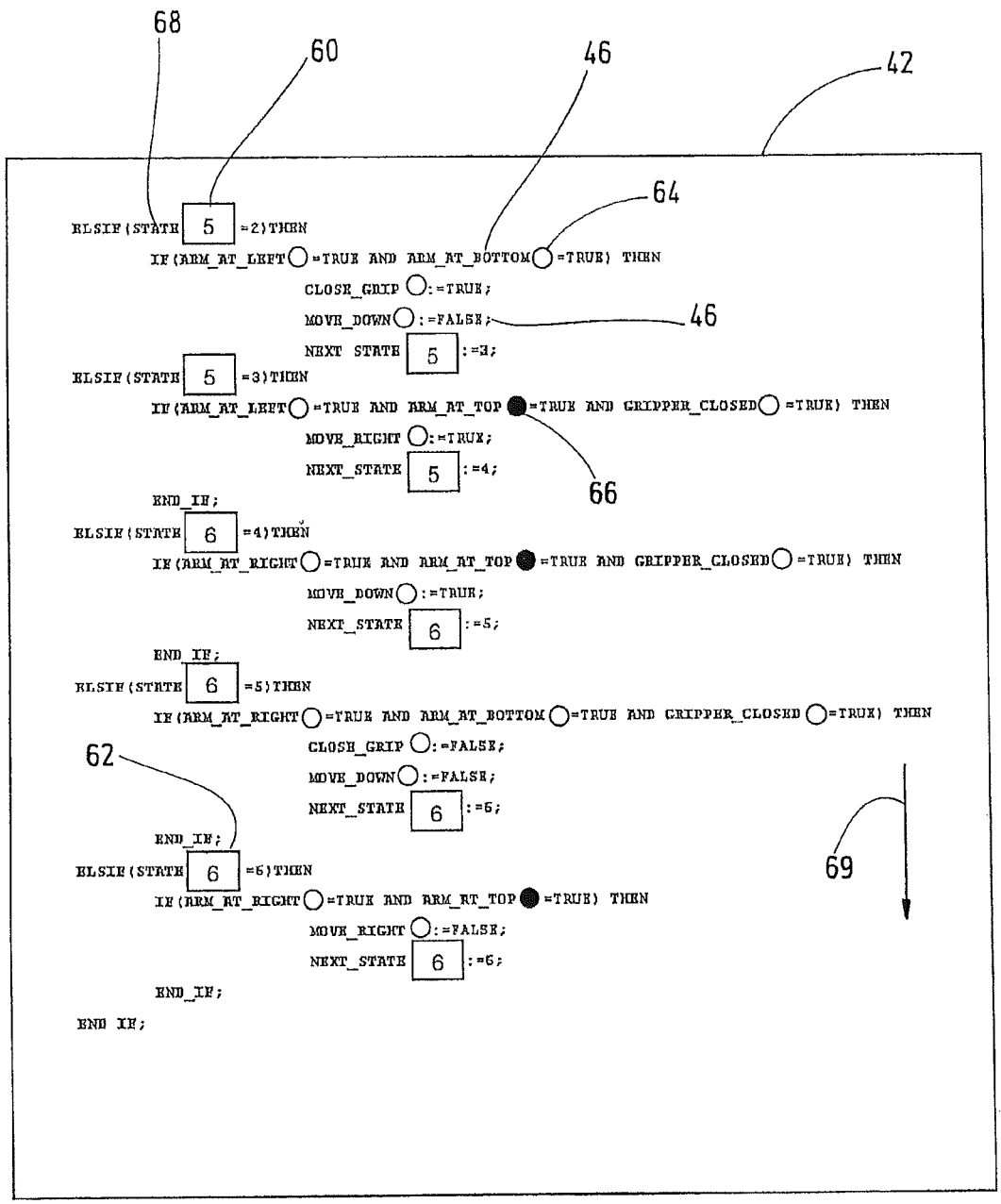
FIG. 4 shows the program editor of FIG. 3 together with real sensor data in accordance with a preferred embodiment.
Figure 5:
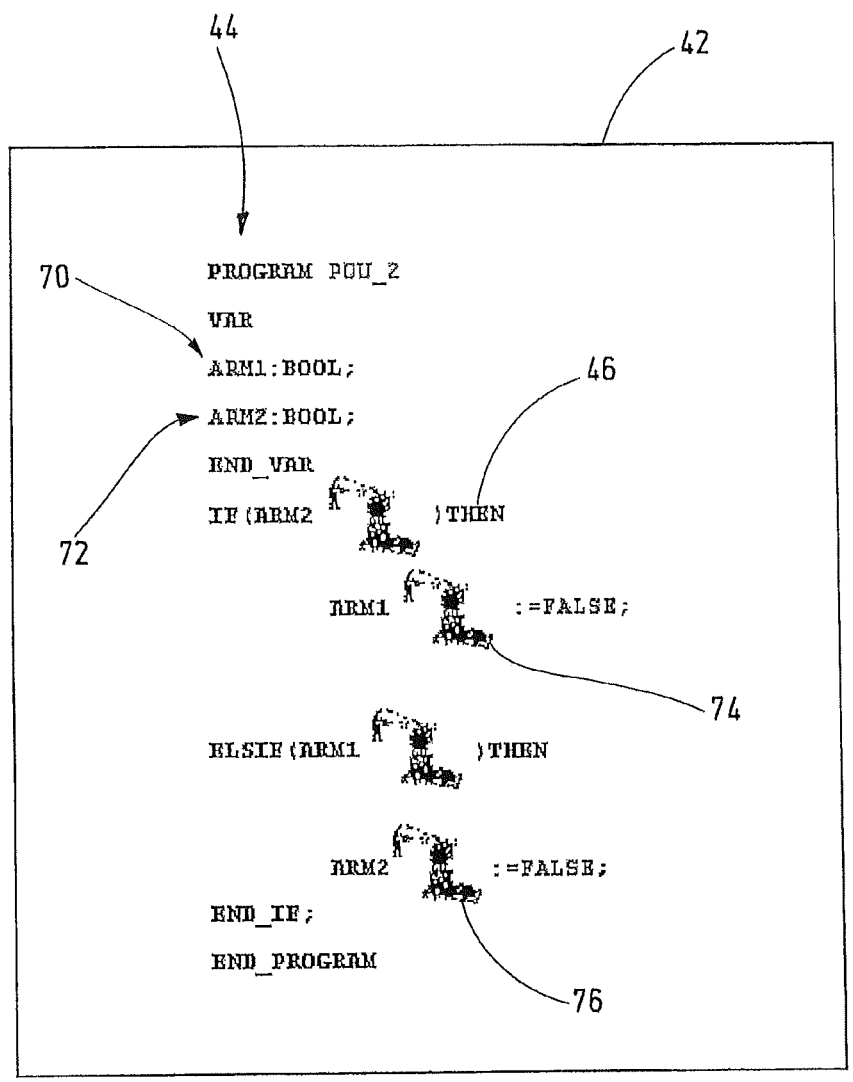
FIG. 5 shows another preferred embodiment of a program editor including high level control instructions and robot symbols representing real system data.

FIG. 4 shows the same program editor 42, but with a limited number of high level control instructions 46 and with debugging tool 52 being activated. As can be seen from FIG. 4, alphanumerical symbols 60, 62 and graphical symbols 64, 66 are displayed together with the high level control instructions 46. Symbols 60, 62 display a current value of high level program variable 68, which is a variable called STATE in the embodiment shown. The current value of program variable 68 is determined from current sensor data by debugging tool 52.

As can be seen from the illustration in FIG. 4, program variable 68 may have different values in the course of the control process as a result of the control operations running and/or as a result of the sensor data changing for other reasons. Debugging tool 52 displays the respective current value of program variable 68 in accordance with a time line corresponding to the temporal sequence 69 of the control instructions in the control process. Therefore, program variable 68 might have a current value of "5" at one high level control instruction, and it might have a current value of "6" at a later control instruction, as is shown at symbols 60, 62 in FIG. 4.

Symbols 60, 62 display alphanumerical values, which might be useful for high level program variables of the type BYTE, WORD, INTEGER or REAL, which are common data types in programming languages according to IEC 61131. In contrast, symbols 64, 66 are graphical symbols which can advantageously be used for displaying a current status of a Boolean variable. In the embodiment shown in FIG. 4, symbols 64, 66 represent a "green light" which might either be "on" or "off". Again, however, the current status of any Boolean program variable symbolized by symbols 64, 66 is determined in accordance with the temporal sequence of the control operations and as a function of real sensor data.

FIG. 5 shows another example of program editor 42 including a high level control program 44 comprised of high level control instructions 46. Program 44 comprises two Boolean variables 70, 72, and the respective current status of each program variable 70, 72 in the course of the control program is indicated by means of graphical symbols 74, 76 which show a pictogram of robot arm 12 here. It is contemplated that graphical symbols 74, 76 may show a current position of robot arm 12 which is determined from a plurality of different sensor data. Debugging tool 52 may be configured to determine a complex data variable from the plurality of sensor data. For example, the complex data variable may correspond to a plurality of sensor data representing a plurality of positional information for each joint of robot arm 12. Symbols 74, 76 may be a picture of robot arm 12 in the respective positions, with each picture representing a different position and, consequently, a different value of the complex data variable.

In the preferred embodiments, the machine code program 38 is executed on controller 14 without any breakpoints and in real time. However, it is also contemplated that a step-by-step mode and/or the use of breakpoints may be used in addition to the new debugging concept, where appropriate.

What is claimed is:

1. A method of programming an industrial controller for controlling an automated installation, the installation having a plurality of possible real system states and comprising at least one sensor for providing sensor data representing a current real system state from the plurality of possible real system states and at least one actuator for acting on the current real system state, and the controller comprising a data memory for storing the sensor data and a program memory for storing a machine code program, the method comprising the steps of:

providing a programming tool having a program editor, a debugging tool and a compiler, the debugging tool having a database comprising a plurality of pictograms each graphically illustrating one from the plurality of possible real system states, creating a high level control program by means of the program editor, the high level control program comprising a plurality of high level control instructions, compiling the high level control program by means of the compiler in order to create a machine code program comprising machine code instructions for repeatedly reading the sensor data into the data memory and for processing the sensor data, loading the machine code program into the program memory, and activating the debugging tool for debugging the high level control program, wherein at least one high level control instruction from the plurality of high level control instructions is shown in the program editor, wherein the machine code program is executed on the controller while the debugging tool is activated, wherein the debugging tool reads the sensor data from the data memory, and wherein the debugging tool assigns the sensor data from the data memory to the at least one high level control instruction, thereby linking the at least one high level control instruction to the current real system state during the execution of the machine code program, and wherein the at least one high level control instruction is a line of text and the debugging tool displays one from the plurality of pictograms at a position within the text of the at least one high level control instruction as a function of the assigned sensor data in order to symbolically mirror the current real system state into the high level control program.

2. The method of claim 1, wherein the debugging tool repeatedly reads the sensor data from the data memory, while the machine code program is executed on the controller.

3. The method of claim 1, wherein the machine code program is executed on the controller in real time.

4. The method of claim 1, wherein the machine code instructions create a history of sensor data showing current and former values of the sensor data in the data memory, and wherein the debugging tool reads the history of sensor data from the data memory and assigns the history of sensor data to the at least one high level control instruction.

5. The method of claim 1, wherein the debugging tool assigns the sensor data to the at least one high level control instruction as a function of a predefined trigger condition.

6. The method of claim 1, wherein the machine code program is executed on the controller in a step-by-step fashion.

7. The method of claim 1, wherein the high level control program comprises a plurality of high level control instructions in a sequential order which corresponds to a temporal sequence during the execution of the machine code program, with the debugging tool assigning the sensor data from the data memory to the at least one high level control instruction in accordance with the temporal sequence.

8. The method of claim 1, wherein a limited number of high level control instructions are selected from the plurality of high level control instructions, and wherein the debugging tool assigns the sensor data from the data memory to the high level control instructions for the limited number only.

9. The method of claim 1, wherein the at least one high level control instruction comprises a high level program variable, with the debugging tool assigning the sensor data from the data memory to the high level program variable.

10. The method of claim 1, wherein the at least one high level control instruction relates to a plurality of sensor data from the data memory, wherein the debugging tool determines a complex data variable from the plurality of sensor data, the complex data variable representing a higher level system state of the installation, and wherein the debugging tool assigns the complex data variable to the at least one high level control instruction.

11. The method of claim 1, wherein the debugging tool displays the sensor data in the program editor at a position close to the at least one high level program instruction.

12. A non-transitory computer readable storage medium containing program code, wherein the program code is configured to carry out a method of programming an industrial controller for controlling an automated installation when the program code is executed on a computer acting as a programming tool for programming the industrial controller, the installation having a plurality of possible real system states and comprising at least one sensor for providing sensor data representing a current real system state from the plurality of possible real system states and at least one actuator for acting on the current real system state, and the controller comprising a data memory for storing the sensor data and a program memory for storing a machine code program, the method comprising the steps of:

providing a programming tool having a program editor, a debugging tool and a compiler, the debugging tool having a database comprising a plurality of pictograms each illustrating one from the plurality of possible real system states, creating a high level control program by means of the program editor, the high level control program comprising a plurality of high level control instructions, compiling the high level control program by means of the compiler in order to create a machine code program comprising machine code instructions for repeatedly reading the sensor data into the data memory and for processing the sensor data, loading the machine code program into the program memory, and activating the debugging tool for debugging the high level control program, wherein at least one high level control instruction from the plurality of high level control instructions is shown in the program editor, wherein the machine code program is executed on the controller while the debugging tool is activated, wherein the debugging tool reads the sensor data from the data memory, wherein the debugging tool assigns the sensor data from the data memory to the at least one high level control instruction, thereby linking the at least one high level control instruction to the current real system state during the execution of the machine code program, and wherein the at least one high level control instruction is a line of text and the debugging tool displays one from the plurality of pictograms at a position within the text of the at least one high level control instruction as a function of the assigned sensor data in order to symbolically mirror the real system state into the high level control program.

13. A programming device for programming an industrial controller of an automated installation, the installation having a plurality of possible real system states and comprising at least one sensor for providing sensor data representing a current real system state from the plurality of possible real system states and at least one actuator for acting on the current real system state, and the controller comprising a data memory for storing the sensor data and a program memory for storing a machine code program, the programming device comprising:
- a general purpose computer having an interface for connecting to the industrial controller,
- a program editor implemented on the general purpose computer for creating a high level control program, the high level control program comprising a plurality of high level control instructions,
- a compiler implemented on the general purpose computer for compiling the high level control program in order to create a machine code program comprising machine code instructions for repeatedly reading and processing the sensor data, and
- the interface being configured for loading the machine code program into the program memory of the controller, and
- a debugging tool implemented on the general purpose computer for debugging the high level control program, wherein at least one high level control instruction from the plurality of high level control instructions is shown in the program editor when the debugging tool is activated, the debugging tool having a database comprising a plurality of pictograms each graphically illustrating one from the plurality of possible real system states,
- wherein the debugging tool is configured to start execution of the machine code program on the controller, wherein the debugging tool is configured to read the sensor data from the data memory, and wherein the debugging tool is further configured to assign the sensor data from the data memory to the at least one high level control instruction, thereby linking the at least one high level control instruction to the current real system state during the execution of the machine code program, and
- wherein the at least one high level control instruction is a line of text and the debugging tool is further configured to display one from the plurality of pictograms at a position within the text of the at least one high level control instruction as a function of the assigned sensor data in order to symbolically mirror the real system state into the high level control program.

\* \* \* \* \*